United States Patent

[11] 3,603,984

| [72] | Inventors | George Harry Heilmeier<br>Yardly, Pa.;<br>Louis Anthony Zanoni, Mercerville, N.J. |
|---|---|---|
| [21] | Appl. No. | 860,660 |
| [22] | Filed | Sept. 24, 1969 |
| [45] | Patented | Sept. 7, 1971 |
| [73] | Assignee | RCA Corporation |

[54] PANEL STRUCTURE FOR MATRIX ADDRESSED DISPLAYS
7 Claims, 3 Drawing Figs.

[52] U.S. Cl. .................................................. 340/378 R
[51] Int. Cl. ..................................................... G08b 5/36,
G09f 13/26

[50] Field of Search............................................ 340/378,
324, 378.1, 381

[56] References Cited
UNITED STATES PATENTS

| 3,323,241 | 6/1967 | Blair et al. .................... | 340/378 X |
| 3,479,646 | 11/1969 | Requa ......................... | 340/324 X |
| 3,530,437 | 9/1970 | Booker, Jr. et al............ | 340/324 R |

*Primary Examiner*—Richard Murray
*Attorney*—Glenn H. Bruestle

ABSTRACT: A panel for a matrix addressed device comprises a plurality of laminated plates having a portion of the matrix addressing circuitry at the laminated surfaces of the plates.

PATENTED SEP 7 1971

3,603,984

INVENTORS
LOUIS A. ZANONI, &
GEORGE H. HEILMEIER
BY
Attorney

PANEL STRUCTURE FOR MATRIX ADDRESSED DISPLAYS

BACKGROUND OF THE INVENTION

This invention relates to matrix addressed displays and more particularly to a structure for use as a support element in such displays.

The prior art includes many matrix addressed displays, such as electroluminescent displays, gas discharge displays and liquid crystal displays, having an x–y or other type matrix for addressing individual display elements. These prior art displays have several limitations and problems associated with them.

Generally, the circuitry for addressing the display elements, including diodes, triodes, resistors, bus bars, interconnects, capacitors, and the like cannot all fit on the back surface of the device so as to allow for a compact device. In addition, if one could place the entire circuitry, in the form of thin or thick film circuits on a supporting panel of such a device, an inoperable circuit could not easily be repaired or replaced by itself and the entire panel may be ruined and moreover, interconnections for addressing individual circuits elements may be difficult to make. Furthermore, problems of isolation and cross talk sometimes exist due to the proximity of x and y matrix elements in the prior art cross-grid type of display.

A structure has now been devised which can significantly reduce the aforementioned problems and at the same time allow for almost arbitrarily complex circuitry to be placed directly upon the support plate of the device.

SUMMARY OF THE INVENTION

A panel for a matrix addressed device comprises a plurality of laminated plates having at least a portion of the matrix addressing circuitry at the laminated surfaces of the plates.

DESCRIPTION OF THE PREFERRED EMBODIMENT

Figure 1:
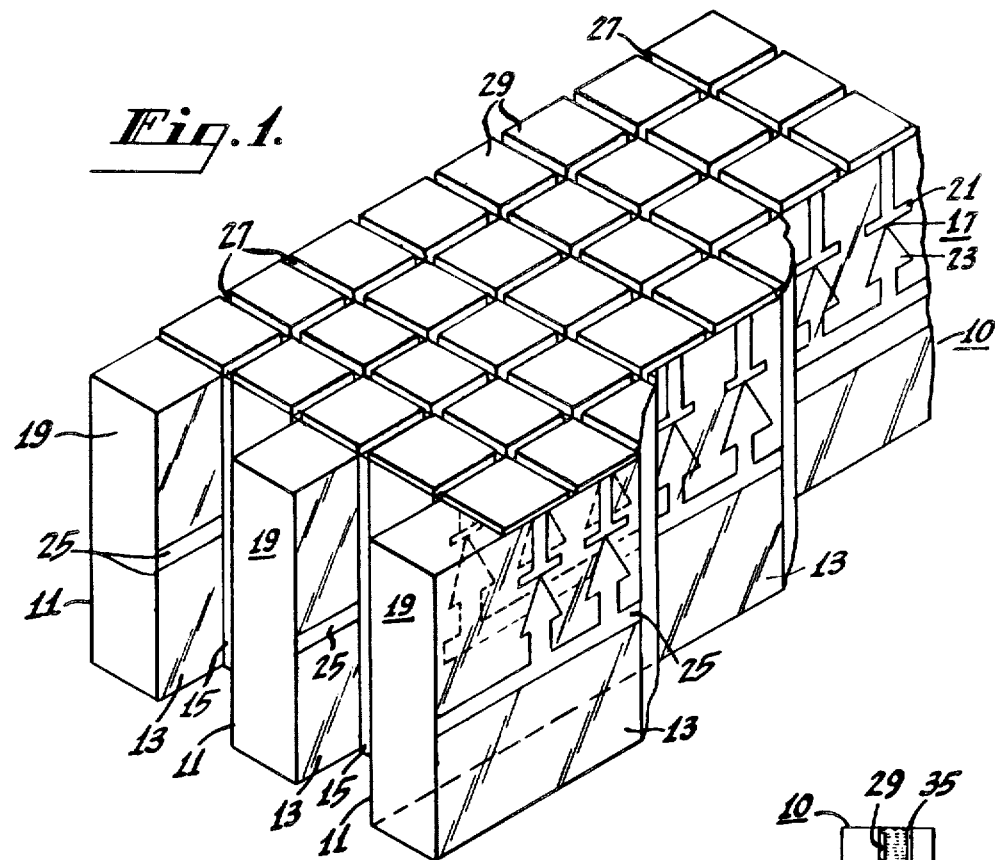
FIG. 1 is a view in perspective partially cut away and partially schematic of an embodiment of the invention.

FIG. 1 is a perspective view of a novel panel useful in a matrix addressed device. The panel 10 comprises a plurality of plates 11 laminated together along major surfaces 13 thereof by means of an electrically insulating adhesive or bonding agent 15. At least one major surface 13 of each plate 11 contains circuit elements 17 useful in addressing a matrix addressed device.

The circuit elements, as illustrated, comprise a row of diodes on one major surface 13 of each plate 11. These diodes are depicted schematically in the FIGURE, for ease of illustration. Actually, such diodes may consist, for example, of two materials, one over the other, so as to form a PN junction therebetween. The diodes along each plate are illustrated as having an anode portion 21 and a cathode portion 23. A bus bar 25, which extends along the length of the plates 11, interconnects all the cathode portions 23 of the diodes on a single plate 11.

Preferably, every other plate 11, is offset along one pair of parallel edges 19. The opposite pair of parallel edges of the plates 11 comprising the laminated panel 10 are maintained flush with each other so as to provide the panel 10 with a flat surface 27. As can be seen from FIG. 1, offsetting the plates in the manner shown provides easy access to the bus bars 25 connecting the circuit elements 17 along each plate 11.

Although the circuit elements 17 illustrated are individual diodes, the term circuit elements are used herein is meant to include any number of active or passive elements in electrical circuit with each other. For example, the addressing circuit may be a complex circuit consisting of diodes, triodes, resistor, capacitors and conductive interconnections.

The plates 11 can be made of glass, quartz, silicon sapphire, alumina, or any other material upon which circuit elements can be deposited or formed.

Individual circuit elements or complete integrated circuits can be deposited or formed upon the plates by well-known techniques such as by thin film, thick film or diffusion techniques. The particular technique used depends somewhat upon the substrate material.

The bus bar 25 or other conductive interconnections necessary to form a circuit may be deposited or formed by the same or similar techniques as those used to form the circuit elements 17. The bus bar 25, for example, may consist of a metal film, a highly doped semiconductor or a conductive metal oxide coating.

Although the addressing circuitry is shown to be present on only one laminated surface of each laminated plate, both such surfaces of each plate may contain circuit elements. The major surfaces of the panel may also be utilized for depositing or forming addressing circuitry thereon in addition to the laminated surfaces of the individual plates comprising the panel.

Alternative to an electrically insulating cement for bonding the laminates, one may first coat the laminate with an insulating film such as silicon oxide, silicon nitride or magnesium fluoride and bond the coated laminates with a conductive cement such as commercially available conductive epoxy cements. In this way, an easily accessible conductive path is provided.

The embodiment shown in FIG. 1 also includes a thin film specular reflector 29 at each display element on the panel. Each specular reflector 29 is electrically connected to the anode portion of the diodes 17.

Figure 2:
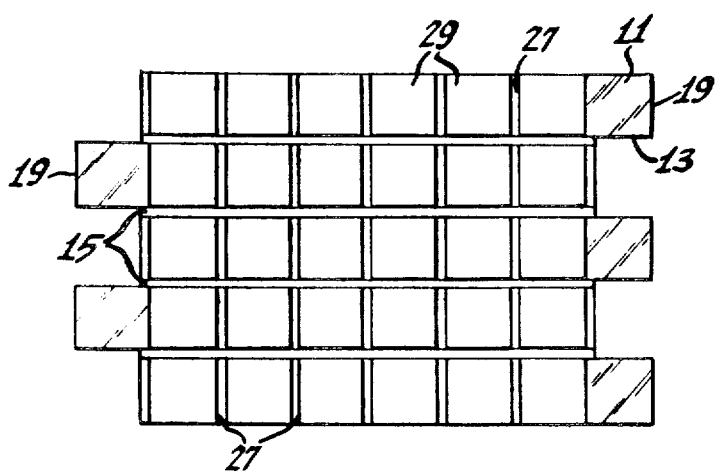
FIG. 2 is a top elevational view of the embodiment shown in FIG. 1.
Figure 3:
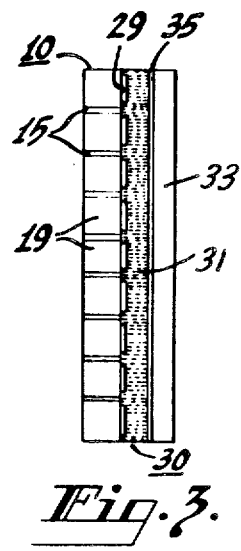
FIG. 3 is a side elevational view of a matrix addressed liquid crystal device including the novel laminate panel as shown in FIGS. 1 and 2.

In FIG. 3, a liquid crystal display device 30 is shown comprising a layer of a liquid crystal composition 31, such as an equiweight mixture of p-n-anisylidene-p'aminophenylbutyrate, p-n-anisylidene-p'-aminophenylpentoate and p-(anisalamino)-phenylacetate or an equiweight mixture of p-n-ethyoxybenzylidene-p'-aminobenzonitrile with p-n-butoxybenzylidene-p'-aminobenzonitrile and p-n-octoxybenzylidene-p'-aminobenzonitrile sandwiched between a front support plate 33 and the novel panel 10 shown in FIGS. 1 and 2. The front support plate 33 has parallel, spaced, transparent conductive strips 35 thereon. The conductive strips constitute column conductors and are arranged perpendicular to the rows of diode elements 17 thereby providing an x–y matrix display. The diodes provide isolation of each display element thereby reducing crosstalk in the matrix display. Isolation between rows if further provided by the laminated plates 11 which separate each row of diodes 17.

In operation, a selected display element is activated by applying a voltage across the liquid crystal composition via a selected row of diodes and a selected column conductor. By selecting the proper operating voltage combination all diodes are biased off except for the one controlling the display element at the intersection of the selected column conductor and a specular reflector 29 in contact with the selected row of diodes. The display element at this intersection will then be activated. Addressing may be element at a time as indicated above, or line at a time.

There may be times when complex circuitry is desired to control each circuit element and where one inoperative circuit element may ruin a device. In such cases, it may be possible to repair the inoperative element in the novel structure by removing from the laminate plate containing that defective circuit element and replacing it with a new plate.

It can be seen from FIG. 3 that the image plane of the device, which is parallel to the front support plate 33, is perpendicular to the laminated surfaces.

We claim:

1. A panel for a device for displaying an image in an image plane and which includes matrix addressing circuit elements comprises a plurality of plates laminated together at surfaces thereof, said plates having at least a portion of said circuit elements at said laminated surfaces, said laminated surfaces being perpendicular to said image plane.

2. A panel for a device having matrix addressing circuit elements comprising
   a. a plurality of laminated plates, the edge surfaces of said laminated plates forming a major surface of said panel,
   b. circuit elements at laminated surfaces of said plates,
   c. means for making electrical contact to said circuit elements.

3. The panel recited in claim 2 wherein said circuit elements at a laminated surface are redundant along the length of said surface.

4. The panel recited in claim 2 wherein said circuit elements are redundant along the length of said laminated surfaces and wherein said means for making electrical contact to said circuit elements includes a bus bar in electrical contact with said redundant circuit elements.

5. The panel recited in claim 1 wherein said laminated plates are alternately offset with one another along one pair of parallel edges and forms a flush surface along the opposite edges thereof and wherein access to circuit elements along a laminated surface is provided by a bus bar extending into the offset region of said plates.

6. A display device including a panel which constitutes a major surface of said device said panel comprising a plurality of laminated plates, the edges of which form said major surface, said plates having redundant matrix addressing circuit elements at laminated surfaces thereof, said laminated surfaces being perpendicular to said major surface, and each of said redundant circuit elements providing control of a display element.

7. The display device of claim 6 further comprising a front support plate having a transparent conductive coating on the inner surface thereof and a liquid crystal composition sandwiched between said plate and said panel.